United States Patent
Soma et al.

(10) Patent No.: US 10,234,279 B2
(45) Date of Patent: Mar. 19, 2019

(54) MOBILE UNIT FOR MEASURING RUNNING PATHS FOR HANDLING DEVICE, SYSTEM AND PROCESS FOR MEASURING THROUGH SUCH MOBILE UNIT

(71) Applicants: Politecnico de Torino, Turin (IT); Hexagon Metrology S.P.A., Moncalieri (IT); Cerrato S.R.L., Beinasco (IT)

(72) Inventors: Aurelio Soma, Turin (IT); Nicola Bosso, Turin (IT); Giorgio De Pasquale, Turin (IT); Dario Cerrato, Beinasco (IT); Michele Cerrato, Moncalieri (IT); Cesare Cassani, Moncalieri (IT); Michele Verdi, Moncalieri (IT)

(73) Assignees: POLITECNICO DE TORINO, Turin (IT); HEXAGON METROLOGY S.P.A., Moncalieri (IT); CERRATO S.R.L., Beinasco (IT)

( * ) Notice: Subject to any disclaimer, the term of this patent is extended or adjusted under 35 U.S.C. 154(b) by 103 days.

(21) Appl. No.: 15/326,276

(22) PCT Filed: Jul. 7, 2015

(86) PCT No.: PCT/IT2015/000176
§ 371 (c)(1),
(2) Date: Jan. 13, 2017

(87) PCT Pub. No.: WO2016/009457
PCT Pub. Date: Jan. 21, 2016

(65) Prior Publication Data
US 2017/0205227 A1    Jul. 20, 2017

(30) Foreign Application Priority Data
Jul. 16, 2014   (IT) ............................. TO2014A0564

(51) Int. Cl.
*G01B 11/26* (2006.01)
*B66C 15/00* (2006.01)
(Continued)

(52) U.S. Cl.
CPC ................ *G01B 11/26* (2013.01); *B66C 7/08* (2013.01); *B66C 9/16* (2013.01); *B66C 15/00* (2013.01); *G01C 7/04* (2013.01)

(58) Field of Classification Search
CPC ....... B66C 15/00; B66C 15/04; B66C 15/045; B66C 7/08; B66C 9/16; G01B 11/26; G01C 7/04
See application file for complete search history.

(56) References Cited

U.S. PATENT DOCUMENTS 4,490,038 A * 12/1984 Theurer .................. G01S 17/08
                                                        33/338
5,331,745 A *  7/1994 Jager ...................... E01B 35/00
                                                        180/169
(Continued)

FOREIGN PATENT DOCUMENTS

DE         2831916 A1    2/1980
DE          212931 A1    8/1984
(Continued)

*Primary Examiner* — John R Lee
(74) *Attorney, Agent, or Firm* — Medley, Behrens & Lewis LLC; Lorri W. Cooper

(57) ABSTRACT

A mobile unit (5) is described for measuring running paths for handling systems, in particular bridge cranes, sliding on a route (2), comprising at least one first measuring device (62) which constitutes a space reference of the mobile unit (5) with respect to at least one fixed measuring unit (3) comprising second measuring device (61), the first measuring device (62) being connected to the mobile unit (5) by interposing at least one handling device adapted to synchronize measuring operations between the first measuring device (62) and the second measuring device (61) of the
(Continued)

fixed measuring unit (3). A system for measuring (1) running paths for handling systems through such mobile unit (5) and a process for measuring through such system (1) are further described.

9 Claims, 3 Drawing Sheets

(51) Int. Cl.
   *B66C 7/08* (2006.01)
   *B66C 9/16* (2006.01)
   *G01C 7/04* (2006.01)

(56) References Cited

U.S. PATENT DOCUMENTS

| | | | | |
|---|---|---|---|---|
| 5,428,902 A * | 7/1995 | Cheah | | G01C 9/20 324/707 |
| 5,926,305 A * | 7/1999 | Ohtomo | | G01C 15/004 250/236 |
| 5,930,904 A * | 8/1999 | Mualem | | G01C 5/00 33/1 Q |
| 6,320,653 B1 * | 11/2001 | Feist | | G01C 9/06 33/366.12 |
| 6,505,406 B2 * | 1/2003 | Robertson | | E01B 1/004 33/1 CC |
| 8,719,474 B2 * | 5/2014 | Ossig | | G06F 9/4411 710/104 |
| 9,341,473 B2 * | 5/2016 | Zogg | | G01C 15/002 |
| 9,511,983 B2 * | 12/2016 | Eidenberger | | B66C 13/46 |
| 9,630,815 B2 * | 4/2017 | Gao | | B66C 17/00 |
| 9,784,579 B2 * | 10/2017 | Sunio | | G01C 15/008 |
| 9,909,263 B2 * | 3/2018 | Rada | | E01B 29/32 |
| 2004/0057795 A1 * | 3/2004 | Mayfield | | A63C 19/06 404/84.05 |
| 2005/0111012 A1 * | 5/2005 | Waisanen | | B61B 3/00 356/622 |
| 2007/0059098 A1 * | 3/2007 | Mayfield | | A63C 19/06 404/84.5 |
| 2007/0171434 A1 * | 7/2007 | Wickhart | | B61K 9/08 356/622 |
| 2010/0171943 A1 * | 7/2010 | Dennig | | G01C 3/08 356/4.01 |
| 2012/0224056 A1 | 9/2012 | Sunio et al. | | |
| 2013/0112643 A1 * | 5/2013 | Lecours | | B66C 13/18 212/276 |
| 2017/0205227 A1 * | 7/2017 | Soma | | G01B 11/26 |

FOREIGN PATENT DOCUMENTS

| | | |
|---|---|---|
| DE | 19906771 A1 | 8/2000 |
| WO | 2011058212 A1 | 5/2011 |
| WO | 2016009457 A1 | 1/2016 |

* cited by examiner

MOBILE UNIT FOR MEASURING RUNNING PATHS FOR HANDLING DEVICE, SYSTEM AND PROCESS FOR MEASURING THROUGH SUCH MOBILE UNIT

BACKGROUND OF THE INVENTION

1) Field of the Invention

The present invention refers to a mobile unit for measuring running paths for handling device, to a system and to the related process for measuring the running paths through such mobile unit.

2) Background Art

An industrial problem dealing with handling device in general, and bridge cranes in particular, is given by geometric positioning errors of the rails during their laying or caused by the premature wear of rolling members, with consequent impossibility of accessing to plants, production stops, high maintenance times and costs.

A solution to this problem is given by a preventive measuring of the running paths in terms of parallelism, levelling and co-planarity and of the location of possible corrective actions adapted to re-establish the optimum conditions of the geometric attitude of the running paths.

The parallelism or gauge measures must be repeated for the whole length of the running paths, through a total station adapted to measure distances and angles comprising at least one laser distance-meter or a laser railer and a target.

The levelling measures, through a graduate rod and a theodolite, must be repeated for the whole length of the running paths.

This type of measures, however, implies cumbersome, manual, scarcely accurate procedures, with high associated times and costs.

WO-2011058212-A1 discloses a measuring system comprising a fixed measuring unit, a data processing unit and a mobile unit. The mobile unit comprises a plane base, a reflector, an elevation element fastened to the base and to the reflector, means adapted to move the base along a surface so that the space orientation of the base an substantially correspond with the space orientation of the part below the surface. Moreover, the mobile unit comprises measuring device adapted to determine an angular deviation between the space orientation of the base and a plane perpendicular to the gravity force and means adapted to remove the deviation effect once having determined it.

WO-2011058212-A1 however is limited to mention the problem of synchronizing different measures performed by the data acquiring system.

Moreover, in the system disclosed in WO-2011058212-A1, the reflector of the mobile unit is fixed with respect to the base of the mobile unit itself, being visible to the fixed measuring unit only for small angles.

SUMMARY OF THE INVENTION

Therefore, object of the present invention is solving the above prior art problems, by providing a system for measuring the geometric attitude of running paths for handling systems, such as the rails of bridge cranes, aimed to reduce necessary times and costs for geometrically configuring the running paths.

Another object of the present invention is providing a system for measuring the geometric attitude of running paths for handling systems, in which the reflecting device of the mobile unit is mobile to be synchronized with a laser ray source of a fixed measuring unit in order to be always illuminated by the laser ray even at relatively long distances.

Another object of the present invention is providing a mobile unit in which the reflecting device is mobile to be synchronized with a laser ray source of a fixed measuring unit in order to be always illuminated by the laser ray even at relatively long distances.

A further object is providing a semi-automatic measuring process, capable of evaluating and certifying the state of compliance of the running paths for handling systems in terms of levelling, parallelism, winding and co-planarity.

The above and other objects and advantages of the invention, as will appear from the following description, are obtained with a mobile measuring unit as claimed in claim 1.

Moreover, the above and other objects and advantages of the invention are obtained with a system for measuring running paths for handling systems as claimed in claim 8.

Moreover, the above and other objects and advantages of the invention are obtained with a process for measuring running paths for handling systems as claimed in claim 9.

Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
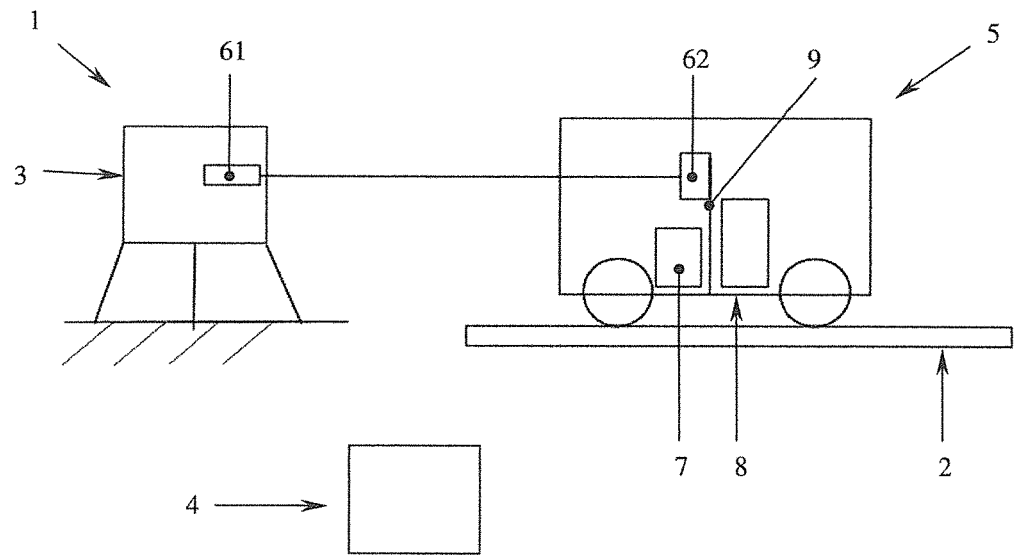
FIG. 1 shows a block diagram of an embodiment of the system for measuring running paths for handling systems, according to the present invention.

With reference to the Figures, it is possible to note that the measuring system 1 according to the present invention for a route 2 belonging to running paths, for example a linear rail 21, of an handling system, in particular a bridge crane, comprises at least one fixed measuring unit 3, at least one control and data processing unit 4 and at least one mobile unit 5 sliding on the route 2 and cooperating with the fixed measuring unit 3 and the control and data processing unit 4.

In particular, the mobile unit 5 according to the present invention, preferably composed of a single-rail trolley, comprises at least one first measuring device 62 which constitutes a space reference of the mobile unit 5 with respect to the fixed measuring unit 3 comprising a second measuring device 61, this space reference being necessary for performing the below operations and being obtained by the very nature of the first measuring device 62 placed on the mobile unit 5 in its travel to perform the necessary measures.

In particular, the first measuring device 62 is connected to the mobile unit 5 by interposing at least one handling device adapted to synchronize measuring operations between the first measuring device 62 and the second measuring device 61 on board the fixed measuring unit 3.

Preferably, the second measuring device 61 is composed of at least one laser ray source and the first measuring device 62 is composed of at least one reflecting device adapted to be illuminated by the laser ray.

Preferably, the handling device comprises at least one motorized rotatable platform 9 assembled on the frame of the mobile unit 5 to allow the first measuring device 62 to rotate depending on the sliding speed of the mobile unit 5 along the route 2, in order to make constantly visible the first measuring device 62 for the second measuring device 61 of the fixed measuring unit 3. In particular, the motorized rotatable platform 9 is adapted to perform the above synchronization by always aligning the reflecting device of the mobile unit 5, with respect to the laser ray source of the fixed measuring unit 3 during the sliding of the mobile unit 5 along the route 2 and allow the measuring operations also with relatively long distances. In order to perform this, the center of the motorized rotatable platform 9 is always above the center of the rail 21 of the route 2 and the motorized rotatable platform 9 is made rotate, when necessary, when the mobile unit 5 moves.

In addition, the mobile unit 5 according to the present invention can comprise one or more fixed reflecting devices 63 cooperating with the second measuring device 61 of the fixed measuring unit 3, and in particular with the laser ray source, to define the initial position of the mobile unit 5 itself along the route 2.

The mobile unit 5 further comprises a third measuring device 7 of at least one angular deviation α and β (not shown in the Figures) of the space reference with respect to a field of force, in which the mobile unit 5 is possibly immersed in its movements, and a fourth measuring device 8 of a variation of at least one lateral size Y of the route 2.

Figure 5:
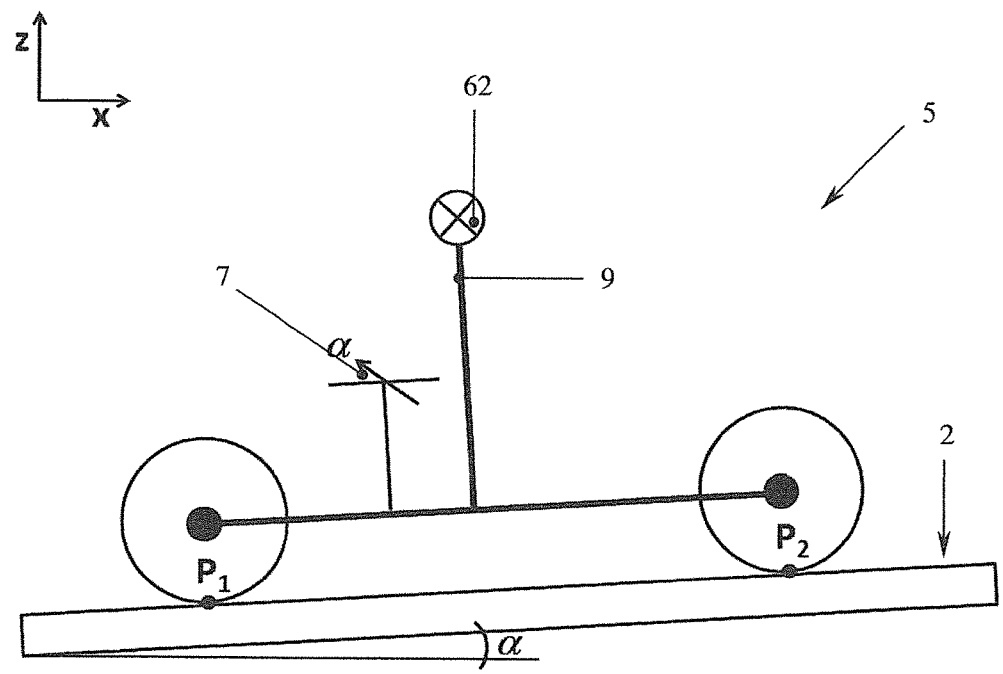
FIG. 5 shows a schematic side view of the mobile unit according to the present invention in an operating distorted configuration.

In particular, the third measuring device 7 comprise at least one bi-axial gravitational inclinometer adapted to measure the angular deviation α, β, respectively along a direction X (FIG. 5), parallel to the longitudinal size of the route 2, and along a direction Y (not shown), orthogonal to the longitudinal size of the route 2.

Figure 2:
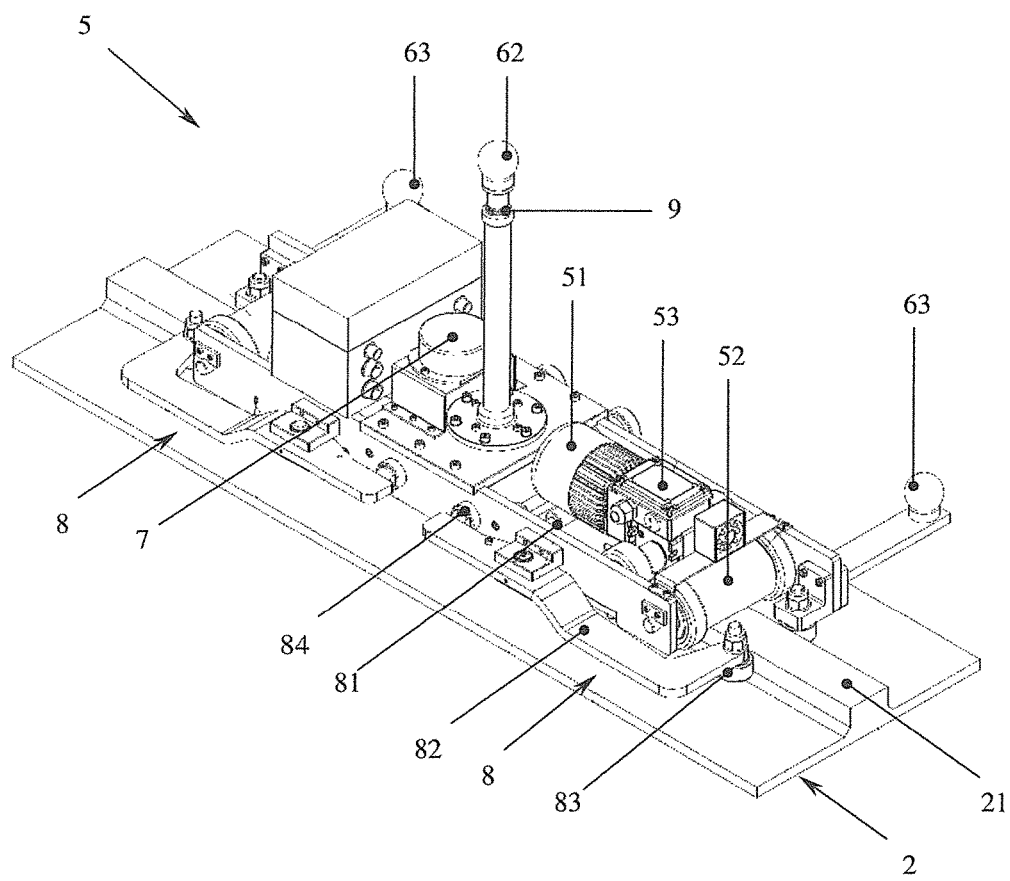
FIG. 2 shows a top perspective view of a preferred embodiment of a mobile unit according to the present invention.
Figure 3:
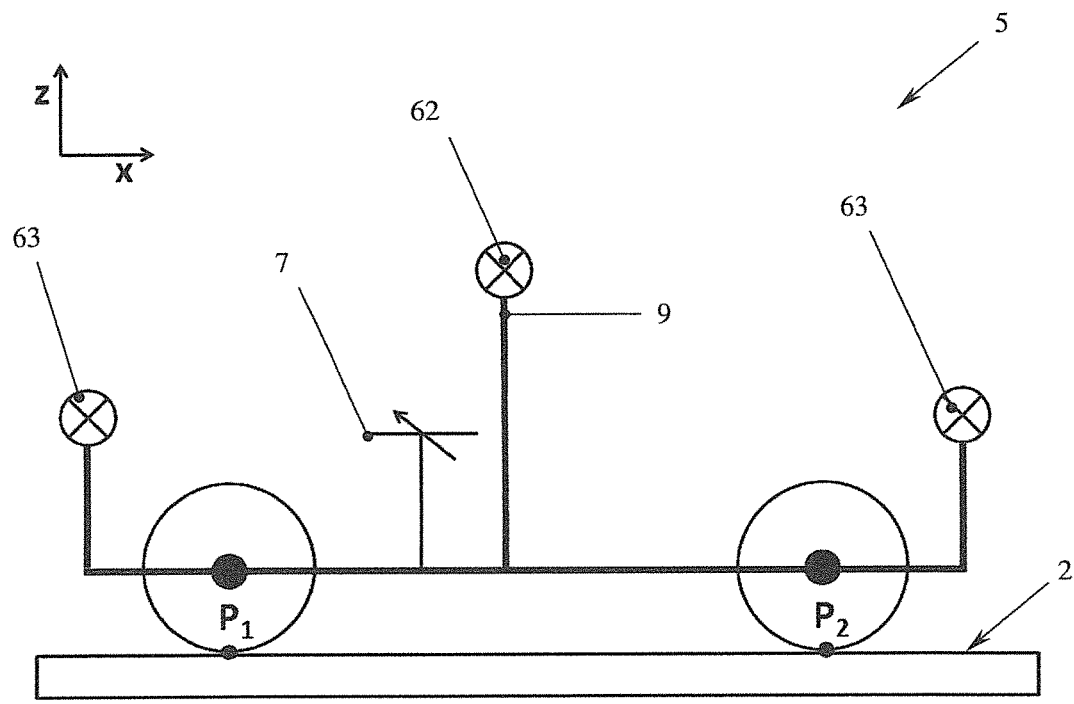
FIG. 3 shows a side schematic view of the mobile unit of FIG. 2 in an operating calibration configuration.
Figure 4:
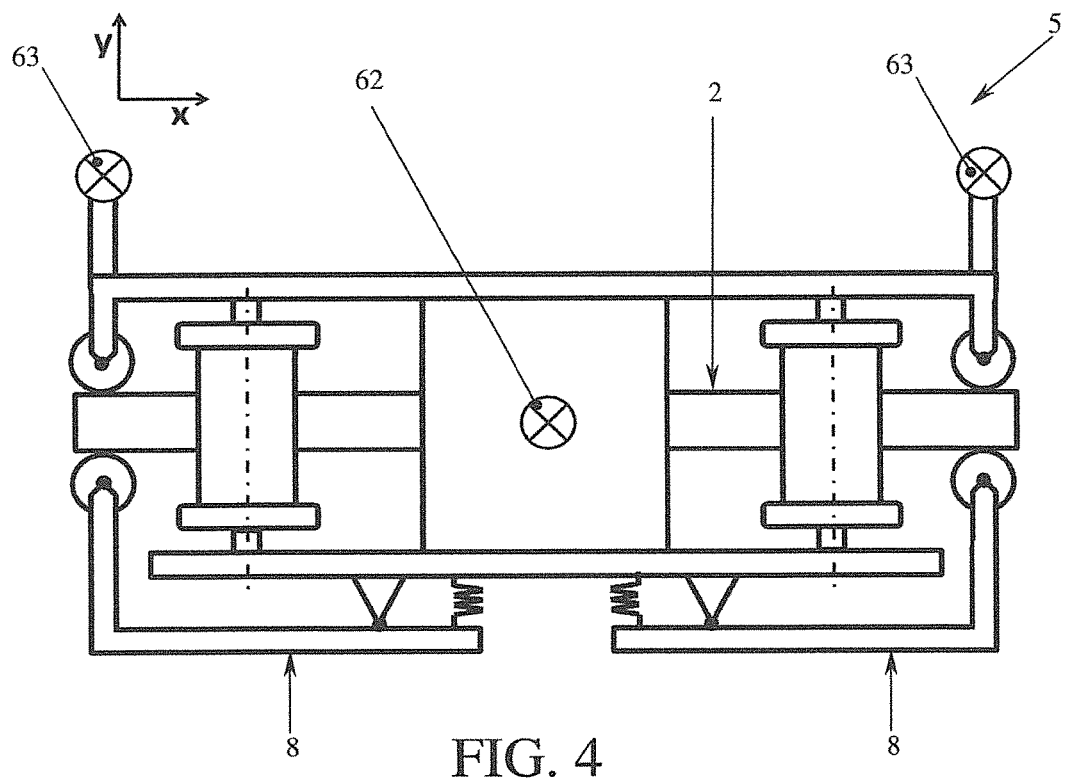
FIG. 4 shows a schematic plan view of the mobile unit of FIG. 3.
Figure 6:
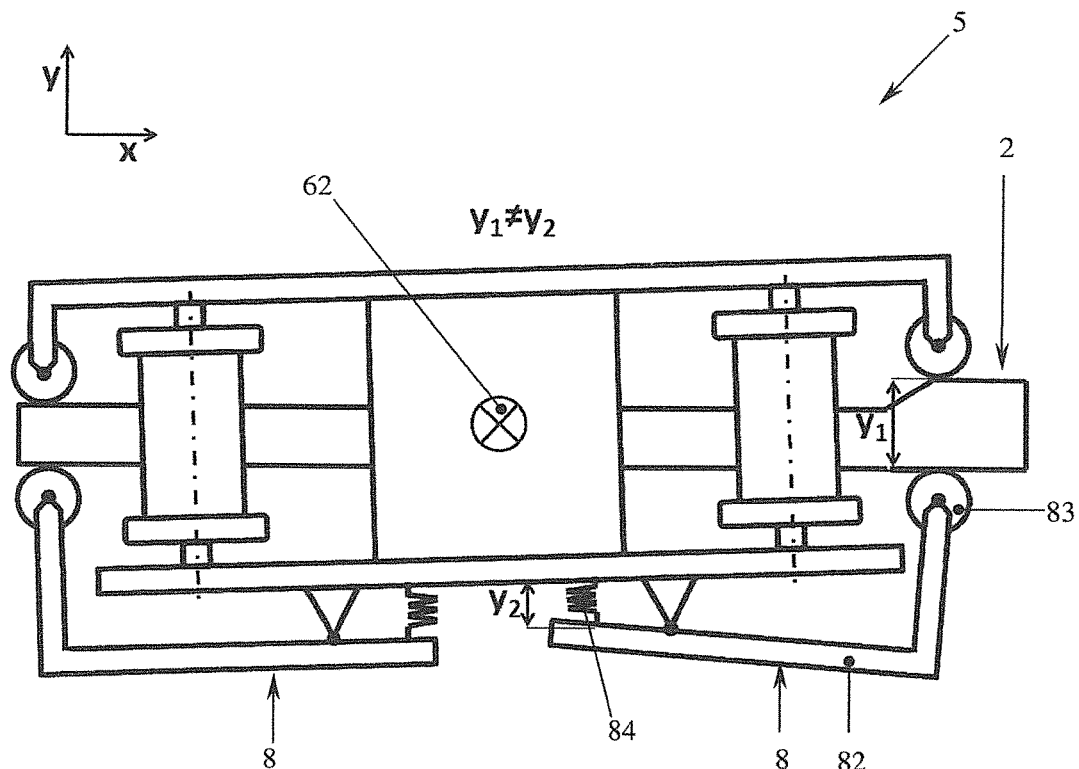
FIG. 6 shows a schematic plan view of the mobile unit of FIG. 5.

With reference to FIGS. 2 and 6, it is instead possible to note that the fourth measuring device 8 comprise at least one inductive displacement transducer 81 and at least one lever 82 pivoted with respect to the mobile unit 5 adapted to transmit to the inductive displacement transducer 81 a variation $Y_1$ of the lateral profile of a rail 21 belonging to the route 2, through at least one feeler 83 sliding along a side surface of the rail 21 and at least one elastic contrasting element 84 adapted to detect a corresponding movement $Y_2$ of the lever 82.

The mobile unit 5 according to the present invention further comprises at least one electric motor 51 adapted to move at least one wheel 52 of the mobile unit 5 itself through a mechanical transmission 53: the electric motor 51 can be remotely controlled through a wireless signal coming, for example, from the control and data processing unit 4.

In addition, it is possible to provide that the mobile unit 5 according to the present invention comprises one or means for shooting photographs and/or videos 10 adapted to photograph and/or videoing the route 2 during the advancement of the mobile unit 5 itself.

The measuring system 1 can be used for measuring the geometric attitude of rails of bridge cranes by performing a semi-automatic measuring process according to the present invention, capable of evaluating and certifying the state of compliance of the running paths of bridge cranes in terms of levelling, parallelism, winding and co-planarity. The degree of non-compliance of the rail is determined taking into account the degree by which the motorized rotatable platform 9 carrying the first measuring device 62 has been rotated. The motorized rotatable platform 9 is controlled in its rotary movements through a wireless signal coming, for example, from the control and data processing unit 4.

Advantageously, therefore, the process according to the present invention for measuring running paths for handling systems, in particular bridge cranes, sliding on a route 2, adapted to certify the state of compliance of the running paths in termini of levelling, parallelism, winding and co-planarity comprises the following steps:

positioning the mobile unit 5 on the rail 21 of a first running path;

positioning the laser ray source on the fixed measuring unit 3;

orienting the reflecting device towards the laser ray source through the motorized rotatable platform 9;

possibly, acquiring an initial position of the mobile unit 5 through the cooperation of the fixed reflecting devices 63 with the laser ray source;

handling the mobile unit 5 through the wireless signal from the control and data processing unit 4;

synchronizing the measuring operations and acquiring the measuring values related to the measuring device 61, 62 through a rotation of the reflecting device through the motorized rotatable platform 9;

saving the acquired measures on the control and data processing unit 4;

repeating the previous steps for a rail 21 of a second running path;

processing the collected data and 2D- and 3D-reconstructing the route 2;

automatically performing correcting actions and putting the running paths in tolerance in terms of parallelism, levelling, winding and co-planarity.

The invention claimed is:
1. A mobile unit for measuring running paths for handling systems, sliding on a route, comprising at least one first measuring device which constitutes a space reference of the mobile unit with respect to at least one fixed measuring unit that is fixed in position and spaced relative to the mobile unit, with the at least one fixed measuring unit comprising a second measuring device, the first measuring device being connected to the mobile unit by interposing at least one handling device adapted to synchronize measuring between the first measuring device and the second measuring device, wherein the handling device comprises at least one motorized rotatable platform to allow the first measuring device to rotate as a function of a sliding speed of the mobile unit along the route in order to make constantly visible the first measuring device for the second measuring device of the fixed measuring unit and for synchronizing said measuring operations between the first measuring device and the second measuring device.

2. The mobile unit of claim 1, wherein the second measuring device is composed of at least one laser ray source and the first measuring device is composed of at least one reflecting device adapted to be illuminated by the laser ray, and a first running path includes one or more rails.

3. The mobile unit of claim 2, wherein the motorized rotatable platform is adapted to align the reflecting device of the mobile unit with respect to the laser ray source of the second measuring device during a sliding of the mobile unit along the route.

4. The mobile unit of claim 3, further comprising a third measuring device of at least one angular deviation of the space reference with respect to a field of force in which the mobile unit is immersed, and a fourth measuring device of a variation of at least one lateral size of the route.

5. The mobile unit of claim 4, wherein the third measuring device comprises at least one bi-axial gravitational inclinometer.

6. The mobile unit of claim 4, wherein the fourth measuring device comprises at least one inductive displacement transducer and at least one lever pivoted with respect to the mobile unit adapted to transmit to the inductive displacement transducer a variation of the lateral profile of a rail of the route through at least one feeler and an elastic contrasting element adapted to detect a corresponding movement of the lever.

7. The mobile unit of claim 6, further comprising at least one electric motor adapted to move at least one wheel through a mechanical transmission, the electric motor being remotely controlled through a wireless signal.

8. A system for measuring running paths for handling systems, sliding on a route using at least one mobile unit according to claim 1, the system comprising the at least one fixed measuring unit, and at least one control and data processing unit, with the at least one mobile unit sliding on the route and cooperating with the at least one fixed measuring unit and the at least one control and data processing unit.

9. A process for measuring running paths for handling systems sliding on a route using a system for measuring running paths for said handling systems, said system having at least one mobile unit according to claim 2, the at least one fixed measuring unit, and at least one control and data processing unit, the at least one mobile unit sliding on the route and cooperating with the at least one fixed measuring unit and the control and data processing unit, said process adapted to certify a state of compliance of the running paths in terms of levelling, parallelism, winding and co-planarity through a mobile unit and the system for measuring running paths, the process comprising the following steps:
  positioning the mobile unit on the rail of a first running path;
  positioning the laser ray source on the fixed measuring unit;
  orienting the reflecting device towards the laser ray source through the motorized rotatable platform;
  optionally acquiring an initial position of the mobile unit through a cooperation of the reflecting device of the mobile unit with the laser ray source;
  handling the mobile unit through a wireless signal from the control and data processing unit;
  synchronizing the measuring operations and acquiring measuring values related to the measuring device through a rotation of the reflecting device through the motorized rotatable platform;
  saving the acquired measuring values on the control and data processing unit as collected data;
  repeating the previous steps for a rail of a second running path;
  processing the collected data and 2D- and 3D-reconstructing the route;
  automatically performing correcting actions and putting the running paths in tolerance in terms of parallelism, levelling, winding and co-planarity.

* * * * *